(No Model.)

J. L. BARRETT.
CARPET STRETCHER.

No. 300,754.  Patented June 24, 1884.

Witnesses.
Wm H Jones
A B Fairchild

Inventor
Joseph L. Barrett
By H. M. Wooster
Atty.

N. PETERS. Photo-Lithographer. Washington, D. C.

UNITED STATES PATENT OFFICE.

JOSEPH L. BARRETT, OF ANSONIA, CONNECTICUT.

CARPET-STRETCHER.

SPECIFICATION forming part of Letters Patent No. 300,754, dated June 24, 1884.

Application filed May 13, 1884. (No model.)

*To all whom it may concern:*

Be it known that I, JOSEPH L. BARRETT, a citizen of the United States, residing at Ansonia, in the county of New Haven and State of Connecticut, have invented certain new and useful Improvements in Carpet-Stretchers; and I do hereby declare the following to be a full, clear, and exact description of the invention, such as will enable others skilled in the art to which it appertains to make and use the same.

The object of my invention is to provide a light, simple, and inexpensive device for stretching carpets, which shall be easy to manage, not liable to get out of repair, and which may readily be adjusted to operate with equal convenience in large or small sized rooms.

With these ends in view I have devised the novel and exceedingly simple device which I will now proceed to describe, reference being had to the accompanying drawings, forming part of this specification, in which—

Figure 1:
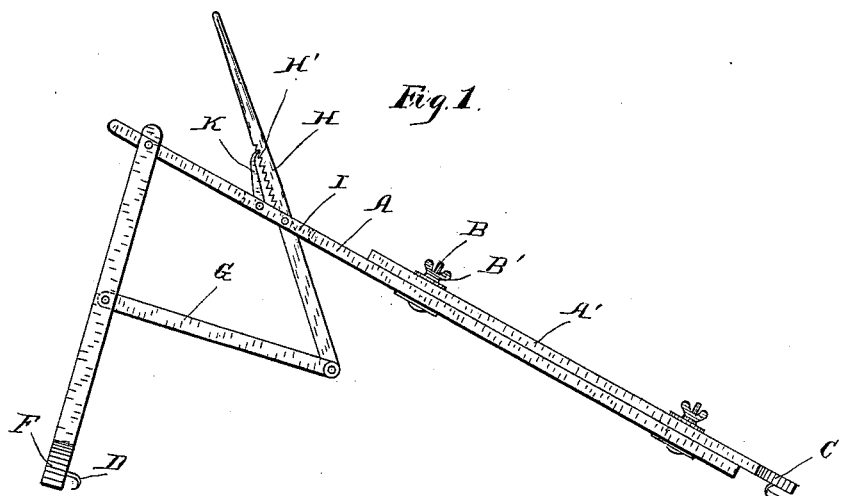
Figure 2:
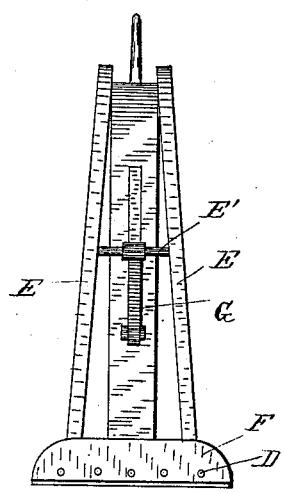
Figure 3:
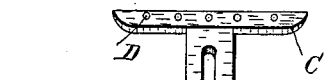

Figure 1 is a side elevation; Fig. 2, a front elevation, and Fig. 3 a plan view.

Similar letters indicate like parts in all the figures.

A and A' represent two strips, each of which is slotted, the two strips being adjustably secured together by bolts B, which pass through the slots and are held in place by thumb-nuts B', which tighten against one of the strips. These strips constitute the adjustable long arm of the device.

C represents a cross-piece, which is attached at one end of the long arm, and is provided with hooks D, which engage the carpet. At the other end of this arm strips E E are pivoted, which constitute the short arm of the device. A cross-piece, F, rigidly secured to the lower end of this arm, carries teeth D, similar to those upon the long arm.

G is a lever pivoted to the short arm about midway of its length, or upon a brace-rod, E', extending across between the strips which constitute the arm. The opposite end of lever G is pivoted to a hand-lever, H, which in turn is pivoted in a slot, I, in the long arm. K is a pawl pivoted in slot I in front of the hand-lever, and engaging with teeth H', to hold the hand-lever, and through said lever the entire device, at any desired adjustment.

It will of course be understood that the exact size or shape of the parts is not of the essence of my invention, as they may be varied to suit the use for which the device is intended without changing the principle of construction. I preferably make the long arm, when shortened up, about double the length of the short arm, and capable of being extended half as long again, so that the device may be used with equal convenience in large or small rooms. The cross-pieces C and F, I preferably make about the width of a breadth of ingrain carpet, or wider, if preferred, and place a sufficient number of hooks in both cross-pieces, so that no great amount of strain comes in one place, and the carpet is not torn. In use I frequently tack the carpet at one side of the room, then place the cross-piece at the end of the long arm against the wash-board. The hooks in cross-piece F are then caught into the carpet not far from the opposite edge. Ordinarily no adjustment whatever is required when the device is placed in use; but should the room be an unusually large one it is merely necessary to loosen the thumb-nuts B', lengthen the long arm as much as may be required, then tighten the nuts again.

To operate the device the hand-lever is drawn backward—that is, toward the lower end of the long arm. This movement through lever G forces the cross-piece at the lower end of the short arm forward, while at the same time the pivot which holds the hand-lever in slot I, acting as a fulcrum, causes the cross-piece at the lower end of the long arm to move an equal distance in the opposite direction, thus stretching the carpet in both directions at the same time. As stated above, however, where it is desired that the stretching of the carpet should be all in one direction, I place the cross-piece upon the long arm against the wash-board, thus when power is applied stretching all parts of the carpet from one side of the room to the other equally, but carrying it all toward the side which has not been tacked. When the carpet has been sufficiently stretched, pawl K engages with teeth H' and acts to hold the device in that position, thus keeping the carpet fully stretched until it is tacked.

Having thus described my invention, I claim—

1. The adjustable long arm and a short arm pivoted thereto, in combination with a lever pivoted to the short arm about midway of its length, and pivoted at its other end to a hand-lever, which in turn is pivoted to the long arm, substantially as described.

2. The long arm consisting of the slotted parts A A', adjustably secured together by bolts having thumb-nuts, and a hand-lever pivoted in said arm, and having teeth H', as shown, in combination with a short arm pivoted to said long arm, a lever connecting said short arm to the hand-lever, and a pawl engaging the hand-lever to hold the parts in any desired position.

3. The adjustable arm and the short arm, both having cross-pieces with hooks C at their lower ends, in combination with lever G, pivoted to the short arm, hand-lever H, pivoted to the adjustable arm and to lever G, and a pawl engaging teeth upon the hand-lever, as described, and for the purpose set forth.

In testimony whereof I affix my signature in presence of two witnesses.

JOSEPH L. BARRETT.

Witnesses:
  WM. A. JONES,
  J. T. WOOSTER.